(12) United States Patent
Graham

(10) Patent No.: US 7,140,857 B2
(45) Date of Patent: Nov. 28, 2006

(54) LABEL LEDGE FOR INJECTION MOLDED CONTAINERS

(75) Inventor: Brian K. Graham, Lodi, OH (US)

(73) Assignee: IML by idesign LLC, Lodi, OH (US)

( * ) Notice: Subject to any disclaimer, the term of this patent is extended or adjusted under 35 U.S.C. 154(b) by 360 days.

(21) Appl. No.: 10/327,499

(22) Filed: Dec. 20, 2002

(65) Prior Publication Data

US 2003/0155262 A1 Aug. 21, 2003

Related U.S. Application Data

(60) Provisional application No. 60/342,730, filed on Dec. 21, 2001.

(51) Int. Cl.
B29C 45/14 (2006.01)

(52) U.S. Cl. .......................... 425/117; 249/96

(58) Field of Classification Search ................ 425/117; 249/96; 264/267, 268, 275
See application file for complete search history.

(56) References Cited

U.S. PATENT DOCUMENTS

| | | | |
|---|---|---|---|
| 3,207,822 A | | 9/1965 | Makowski |
| 4,218,204 A | * | 8/1980 | Edwards .................. 425/129.1 |
| 5,193,711 A | * | 3/1993 | Hirata et al. ................ 425/503 |
| 5,460,768 A | | 10/1995 | Akao et al. |
| 5,604,006 A | | 2/1997 | Ponchaud et al. |
| 5,614,146 A | * | 3/1997 | Nakamura et al. ........ 425/129.1 |
| 5,782,388 A | | 7/1998 | De Nervo |
| 5,908,590 A | * | 6/1999 | Yoshimi et al. .......... 425/126.1 |
| 6,257,431 B1 | | 7/2001 | Baudin |
| 6,635,196 B1 | * | 10/2003 | Goggins ..................... 264/1.7 |
| 6,718,664 B1 | * | 4/2004 | Williams ..................... 40/324 |
| 2002/0114080 A1 | | 8/2002 | Guest |

FOREIGN PATENT DOCUMENTS

| | | | |
|---|---|---|---|
| EP | 0 492 052 A2 | | 7/1992 |
| GB | 2299967 A | * | 10/1996 |
| JP | 06015795 A | * | 1/1994 |
| JP | 08132477 A | * | 5/1996 |
| JP | 08197574 A | * | 8/1996 |
| JP | 10156871 A | * | 6/1998 |
| JP | 2000351136 A | * | 12/2000 |
| JP | 2001328138 A | * | 11/2001 |

OTHER PUBLICATIONS

Translation of JP 2001-328138.

* cited by examiner

Primary Examiner—Robert B. Davis
(74) Attorney, Agent, or Firm—Barbara A. Wrigley; Oppenheimer Wolff & Donnelly LLP

(57) ABSTRACT

An improved in mold label for use in labeling products made by injection, or other, molding technologies has a zig-zag shaped edge cut contained in a registration area which contains ink that matches the product resin. At least one ledge is formed in a cavity wall of the mold proximate the position intended for receipt of an in mold label. The ledge protects the leading edge of the in mold label from the flow of resin through the cavity walls of the mold. Because the label leading edge is protected, the resin flows over the label and pins the label to the cavity wall of the mold, creating a container with the label formed on the container wall. Alternatively, a container lid is provided with a ledge to facilitate skirting and label placement on the pan area of the lid. These features both enhance the structural integrity and the uniform unblemished appearance of the finished molded container. Because of the enhanced structural integrity, high melt resin may be used to create the container, reducing the cycle time, and thus the cost of the product. The lack of blemishes in the finished container reduces manufacturing waste.

6 Claims, 19 Drawing Sheets

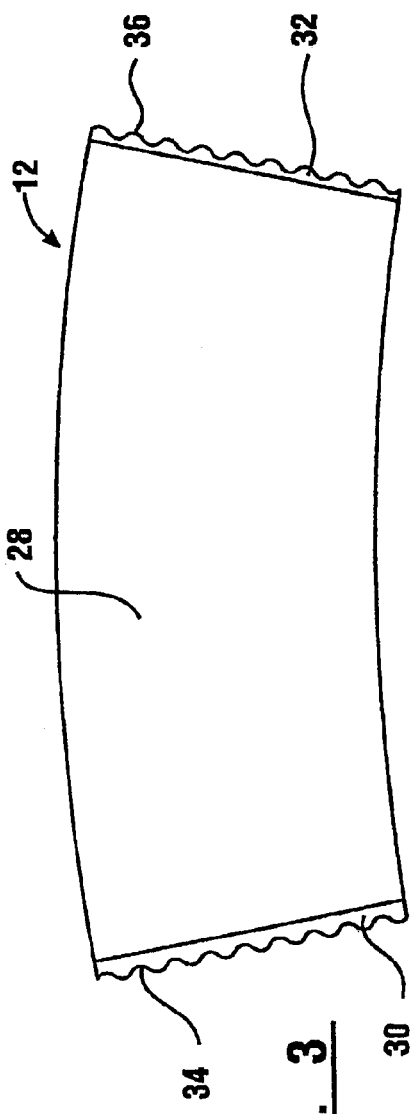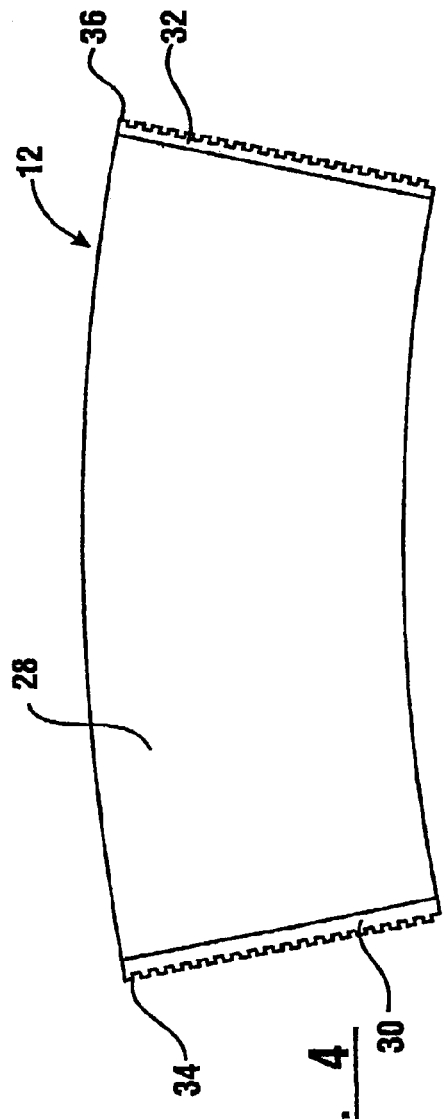

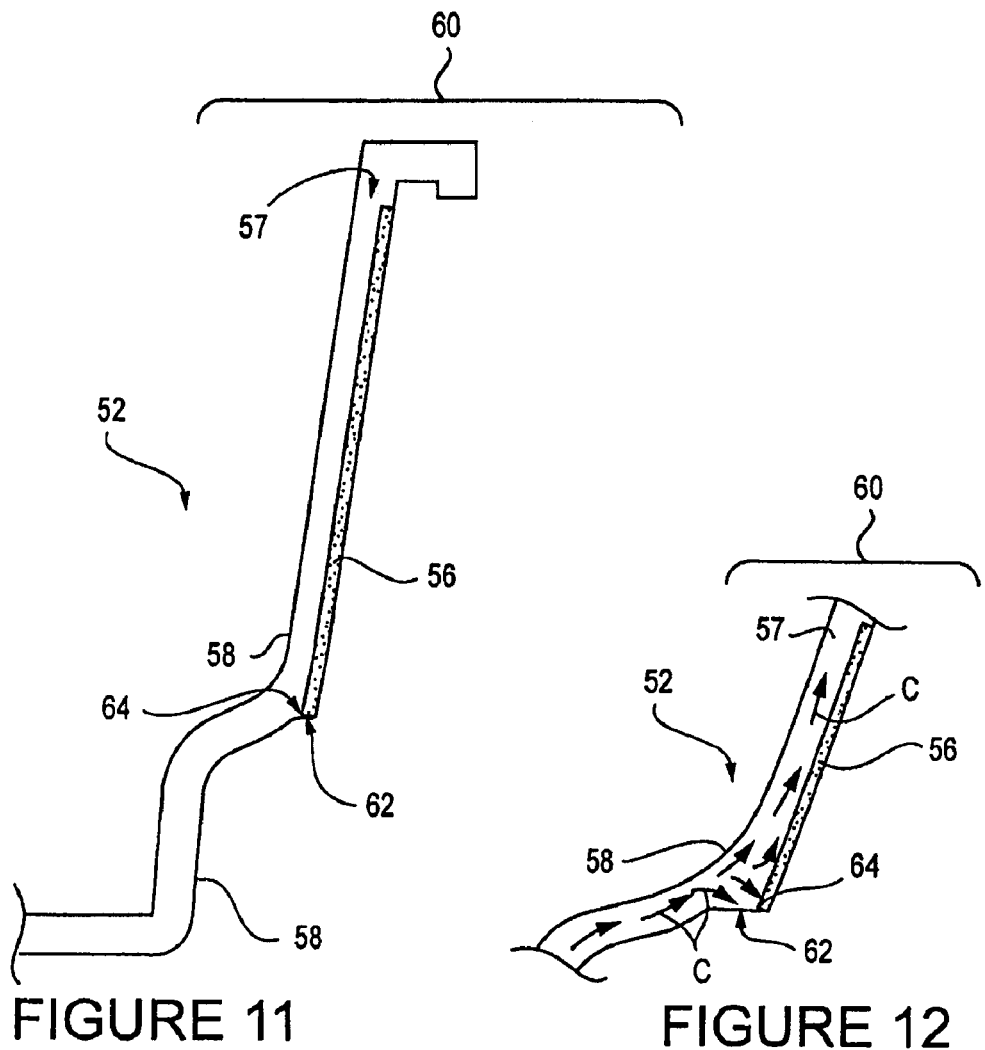

LABEL LEDGE FOR INJECTION MOLDED CONTAINERS

CROSS REFERENCE TO RELATED APPLICATIONS

This application claims benefit from previously filed provisional application Ser. No. 60/342,730, filed Dec. 21, 2001, and non-provisional application Ser. No. (not yet assigned), filed Dec. 20, 2002, which is incorporated herein by reference.

BACKGROUND OF THE INVENTION

This invention relates generally to an improved label for food and drink containers made using an injection molding process. Specifically, this invention relates to a label ledge which supports a label that is applied to the product packaging during the injection molding process which results in a stronger, more attractive container than those made using in mold labeling.

Many plastic products are made using either injection or blow mold technology. Products that are made by injection molding are typically made using either a low melt resin or a high melt resin. When a lightweight or thin walled container is desired, it is generally more cost effective to make it from a high melt resin. This is because the high melt resin is more fluid at its processing temperature, and can more easily flow into the mold than can the low melt resin at its processing temperature. This quality permits the manufacturer to produce the products much more quickly using a high melt resin because the cycle time can be reduced.

Often it is desirable to place labels or designs on molded products. These labels or designs may either be applied to the product during the manufacturing of the product by using an in mold label, or afterwards using a label which is glued, printed, or otherwise applied to the finished product. It is generally more desirable to use an in mold label when creating commercial containers, because the label then becomes an integral part of the container. In mold labels generally create a more attractive product than labels which are glued or otherwise applied to the container after it has been manufactured. In addition to the initial appearance, using an in mold label also increases the commercial value of the container by creating a product that will remain attractive and visible after its direct use as a delivery container. Labels that are glued or otherwise applied to the container after manufacturing often peel or wash off. A label applied in mold will remain with the container as long as the container exists, with essentially the same appearance as the day the container was manufactured, thus creating a relatively permanent advertisement. This is particularly true when a label is applied to food product containers, which are often reused for food storage or consumption after the initial contents have been consumed.

Conventional or lenticular labels used during the injection molding process commonly obtain a latent fracture along the seam line, or other straight edges, when a label is applied in mold. A latent fracture can easily be turned into a full fracture by applying pressure on opposite sides of the container to which a traditional label has been applied. This is undesirable in a product subjected to repeated squeezing, such as drinking cups and container tops. Moreover, when these containers are subjected to extreme temperatures, such as when they contain ice cream, the extreme temperatures often cause a full fracture to develop along the latent fracture line.

In order to avoid such fractures, manufacturers typically use low melt resin to create containers to which labels are applied in mold. The sturdier container, which results from using the low melt resin, is less prone to fracture. However, using the low melt resin increases the cost of each container because of the increased processing time. In addition, the resulting containers are often heavier or have thicker walls than necessary for the product that the container is designed to hold.

In addition, manufacturers must typically keep large stocks of resin on hand for use in the molding process. Some manufacturers use high melt resin for the bulk of their products, but must also keep low melt resin available to produce in mold labeled products which cannot be made out of high melt resin, solely because the of the latent fractures created by the traditional in mold labels. By using a label which can be applied in mold to a high melt resin container, manufacturers may be able to avoid maintaining this additional stock of low melt resin.

Often the injection molding process drags ink from the edge cuts of the in mold label into the resin used to form the container, causing undesirable streaks in the resulting container. These streaks appear in the stacking ring and body of a container, which is generally unlabeled and downstream from the injection site. Although the resulting ink streaks are harmless, they are commercially unacceptable. As a result, a portion of each batch of containers must be discarded because their appearance is unacceptable. This streaking occurs when both low melt and high melt resin are used, and cannot be overcome by selection of an appropriate resin type.

Many containers formed via the injection molding process have radiused corners. For example, plastic cups commonly have a body that extends from a base. In some cases the body extends radially outwardly from the base. Problems arise when the corners or radiused portions of the container are adjacent the area where the in mold label is to be placed.

In an in mold labeling injection molding process, the mold has radii formed at various portions to define the cup or container. The label is placed along a cavity wall within the mold at the desired location. When the resin is injected into the mold, the resin flow of plastic often pushes the label out of the desired location, as opposed to pinning the label along the cavity wall of the mold. The flow of resin displaces the label away from the cavity wall and flows around both sides of the label, causing scrap. This leads to the wasting of large amounts of molding material, which correlate to increased manufacturing costs. Furthermore, the labels are not currently placed on elevated planes of containers. The labels are typically placed on the container, but not on the bottom of the container.

Finally, lids are often placed onto these cups and containers. Labels may be placed onto the lids to preserve the products residing therein. The labels may be decorative and positioned along the side panel of the lid, known as skirting, as well as on the top, or pan area, of the lid. However, the attempts to place labels on the container lids encounter the same challenges as seen with the labels placed around the container body: The lids have corners or radiused portions adjacent the area where the in mold label is to be placed.

Thus, a need exists for a label that can be applied during the injection molding process that does not permit displacement of a label during the flow of resin through the mold. Further, there is a desire to place labels on in mold container on an elevated plane. Finally, there is a desire to apply labels to containers as well as container lids during the injection molding process with an aesthetically pleasing result.

BRIEF SUMMARY OF THE INVENTION

It is an object of an exemplary form of the present invention to provide an in mold label that can be used in in mold labeling injection molding processes and prevents or minimizes label displacement during resin flow through the mold.

It is an object of an exemplary form of the present invention to provide a means of applying, in mold, a permanent decorative design to a container formed by injection molding that does not create visible streaks in the resulting product.

It is an object of an exemplary form of the present invention to provide an in mold label which permits manufacturers to reduce cycle time for a given product created by the injection mold process by using high melt resin.

It is an object of an exemplary form of the present invention to provide an in mold label that permits manufacturers to create products that do not develop latent fractures.

It is an object of an exemplary form of the present invention to provide a label that permits a manufacturer to select a single resin type for the manufacturing of both labeled and unlabeled products, thus permitting the manufacturer to minimize the expenses associated with maintaining stocks of multiple resin types.

It is an object of an exemplary form of the present invention to provide a label that can be applied in mold to containers and lids formed by the injection/blow mold process, without creating latent fractures.

It is an object of an exemplary form of the present invention to provide a label that can be applied in mold to containers and lids formed by the injection/blow mold process, without creating visible ink streaks.

It is an object of an exemplary form of the present invention to provide a label that can be applied in mold to containers and container lids, formed by the injection/blow mold process, resulting in the creation of both durable and attractive objects.

Further objects of an exemplary form of the present invention will be made apparent in the Detailed Description of the Invention and the appending claims.

The foregoing objects are accomplished in an exemplary embodiment of the invention by an in mold label edge cut that creates a seam without creating a latent fracture in the product to which a label is applied. Because the edge cut does not create a latent fracture in the product, high melt resin may be used to produce the product without creating a risk that the product will fracture. Because high melt resin is more fluid at its processing temperature than low melt resin, it can be injected into the mold more quickly. As a result, using such a label the manufacturer can significantly reduce the time necessary to produce each container, thus reducing production costs.

In addition, at least one ledge is formed in a cavity wall of the mold proximate the position intended for receipt of an in mold label. The ledge protects the leading edge of the in mold label from the flow of resin through the cavity walls of the mold. Because the label leading edge is protected, the resin flows over the label and pins the label to the cavity wall of the mold.

Because the improved label may be used with both high melt resin and low melt resin products, a manufacturer need not maintain a stock of low melt resin solely for the purpose of compensating for weaknesses created by the use of a traditional in mold label. This permits the manufacturer to select and maintain a single resin stock which is most suitable for the containers to be produced, further reducing production costs.

Finally, the label is designed so that any ink along a cut edge is the same color as the container resin. This renders any ink streaks invisible; thus eliminating product waste that results from containers that have an appearance which is commercially unacceptable.

BRIEF DESCRIPTION OF THE DRAWINGS

FIG. 3 is a design plan for an exemplary embodiment of an in mold label for a cup.

FIG. 4 is a design plan of another exemplary embodiment of an in mold label for a cup.

FIG. 11 is a cross-sectional drawing of the cavity walls of the mold of the present invention with a label positioned on the ledge.

FIG. 12 is a cross-sectional drawing of the flow of plastic resin within the cavity walls of the mold of the present invention with a label ledge.

FIG. 13 is an illustration of a cup with a label ledge according to the present invention.

DETAILED DESCRIPTION OF THE INVENTION

It should be understood that positional references in this specification, including but not limited to above, below, right, left, vertical, and horizontal, are used solely for the purpose of identifying the portion of a particular illustration to which reference is made, and do not indicate an absolute position.

Figure 1:
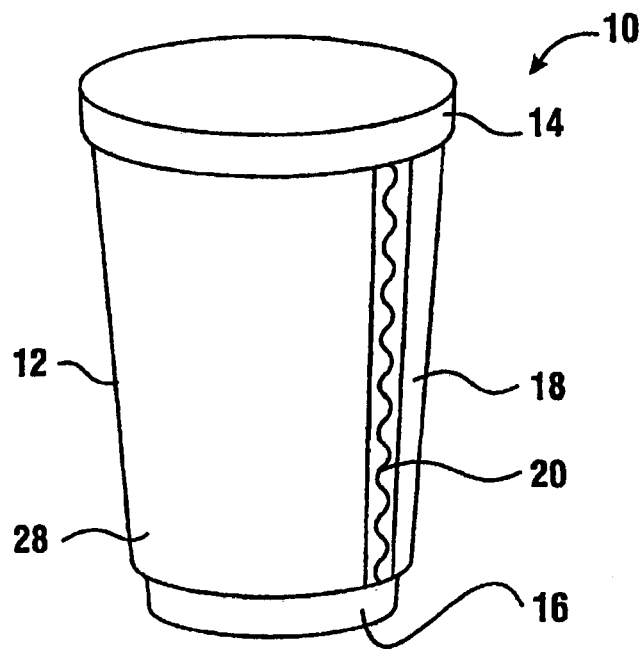
FIG. 1 is a perspective drawing of a labeled cup.

Referring now to FIG. 1, there is shown a cup formed using an injection mold. The cup is generally referred to by reference numeral 10. Cups 10 of this nature are often provided to customers buying beverages at carry-out restaurants, sports events, amusement parks and other similar events. Cups 10 are often taken home by customers, and reused for casual dining, providing an opportunity for others to view whatever design is on the cup 10.

The exemplary cup 10 bears a label 12, which wraps around the cup 10, and was applied in mold. As illustrated in FIG. 1, label 12 contains a joined registration area 18. Roughly in the center of the joined registration area 18 is a seam 20, which is formed where the edges of a label 12 meet. Above and below a label 12 are portions of the cup 10 that are not covered by a label 12. In this exemplary embodiment a label 12 does not cover the entire surface of the cup 10, as a stacking ring 14, above, and a base 16, below, are uncovered. It should be understood that in other embodiments a label 12 may cover the entire vertical surface of the cup 10, or it may leave one or both of the base 16 or stacking ring 14 uncovered. Further, a label 12 may comprise more than one strip which, when applied, creates an appearance of horizontal stripes of alternating labeled and unlabeled portions.

In this exemplary embodiment, label 12 is of the wrap around variety, which creates a generally cylindrical labeled surface on cup 10. In other embodiments, a label 12 may cover only a portion of the cylindrical surface of the cup 10, and may be rectangular, or circular, or any other suitable shape, as will be discussed further below. The walls of the cup 10 form roughly an inverted truncated cone. It is contemplated that other embodiments (not shown) the walls of cup 10 may bear a different shape, including cylindrical, stepped cylindrical, or any other shape that can be formed in an injection mold.

Figure 2:
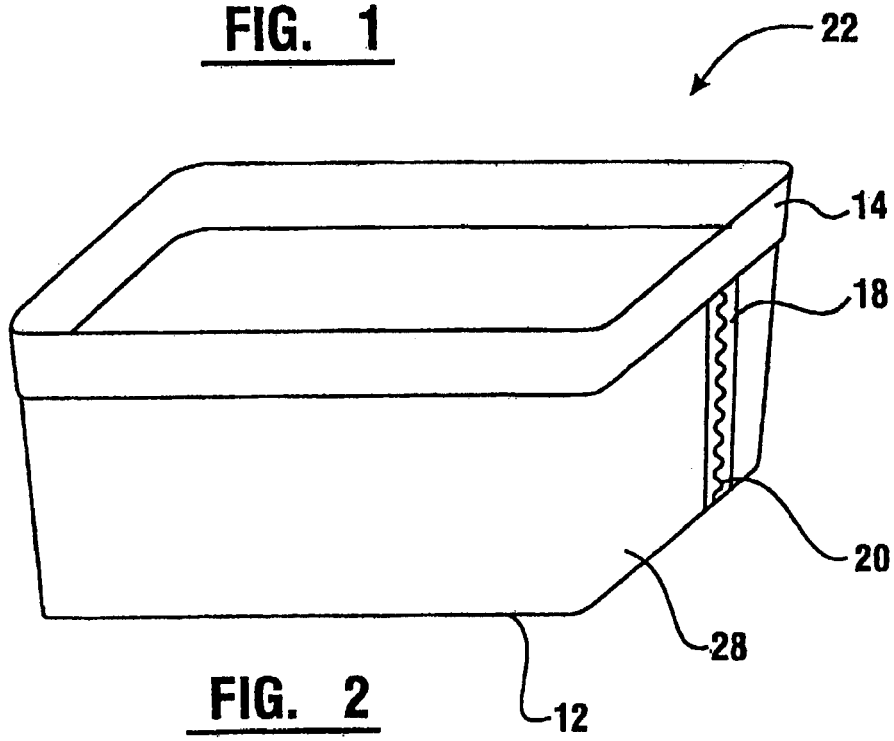
FIG. 2 is a perspective drawing of a labeled rectangular food container.

Similarly, FIG. 2 shows a roughly rectangular container that is generally indicated by reference numeral 22. Containers of this general shape are currently used to hold ice cream, prepared salads, detergent, toys, and a number of other foods or objects. Containers of this type are often reused by customers for storage. This creates an opportunity for long term advertising if an appropriate label is applied to container 22.

As shown in FIG. 2, container 22 bears a label 12, applied in mold, that wraps around the container 22. Label 12 contains a joined registration area 18. Roughly in the center of the joined registration area 18 is a seam 20, that is formed where the edges of a label 24 meet. Above label 12 is a stacking ring 14 which is not covered by label 12. Although label 12 does not cover the entire vertical surface of the container 22, it should be understood that in other embodiments label 12 may cover the entire surface of container 22, as well as be shaped to leave one or both of the stacking ring 14 and base 16 (not shown) uncovered. Label 12 is of the wrap around variety, comprising a band around the container 22, covering the vertical surface except for a stacking ring 14. Alternatively, label 12 may comprise more than one strip which, when applied, creates an appearance of horizontal stripes of alternating labeled and unlabeled portions.

In further embodiments, label 12 may cover only a portion of the surface of the container 22, and may be rectangular, or circular, or any other suitable shape, as will be discussed further below. In this exemplary embodiment, the container 22 is roughly in the shape of an open rectangular box. In other embodiments, the container 22 may resemble an open box of a different shape, including hexagonal, triangular, stepped, or any other shape which can be formed in an injection mold and would make a suitable container 22. It should be understood that a cup 10 is an embodiment of a container 22. Any reference in this specification to a container 22 or to a label or design suitable for application to a container 22, should be understood to include a cup 10, or a label or design suitable for application to a cup 10.

Figure 7:
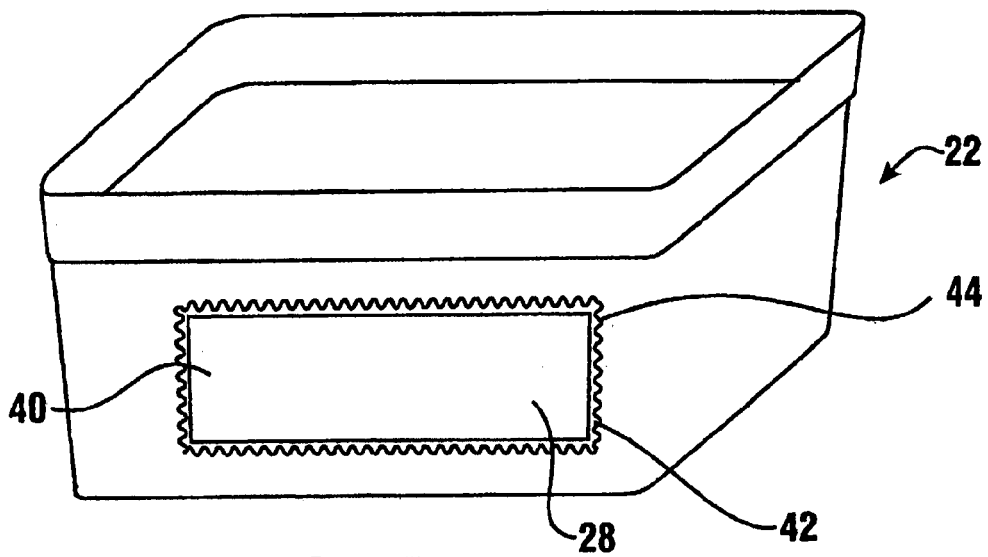

As noted above, it is also sometimes desirable to supply a smaller label to a container that covers only a portion of the package. In FIG. 7, an exemplary embodiment of a container 22 is shown labeled with an exemplary smaller isolated label 40. Label 40 contains an edge cut 44, a registration area 42, and a design area 28. Although the shape of the exemplary label 40, illustrated in FIG. 7, is rectangular, it is contemplated that label 40 may have different shapes, such as circular, polygonal, or irregular. For ease of discussion, any reference in the remainder of this section to a label 12, should be understood to include the exemplary embodiment of a label 40 illustrated in FIG. 7. Similarly, references to registration areas 30 and 32 should be understood to include the exemplary embodiment of a registration area 42 of the exemplary embodiment illustrated in FIG. 7, and references to edge cuts 34 and 36 should be understood to include the exemplary embodiment of an edge cut 44 illustrated in FIG. 7.

Although two containers labeled in mold using exemplary embodiments of improved in mold labels are illustrated in FIGS. 1 and 2, the exemplary labels may be applied to containers of many shapes and sizes, and to products other than containers. The particular exemplary embodiments discussed are in mold labels for containers formed in an injection mold. In other embodiments, exemplary in mold labels or designs may be applied to containers or other objects formed in a blow mold, or by using other technology that exists or may be developed for the molding of plastic resin.

Figure 8:
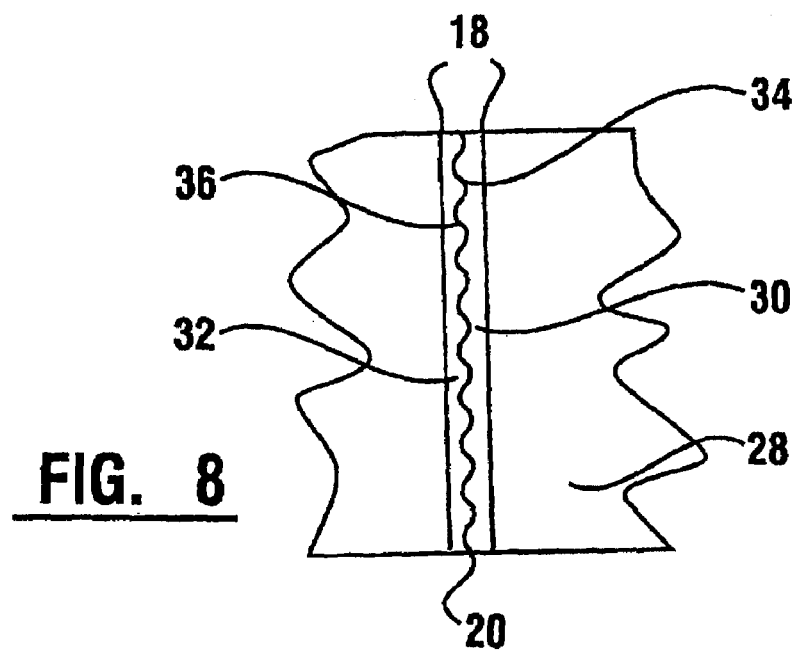
FIG. 8 is an illustration of the exemplary edge cuts, and adjacent portions of the label of FIG. 3, in proximity to each other.
Figure 9:
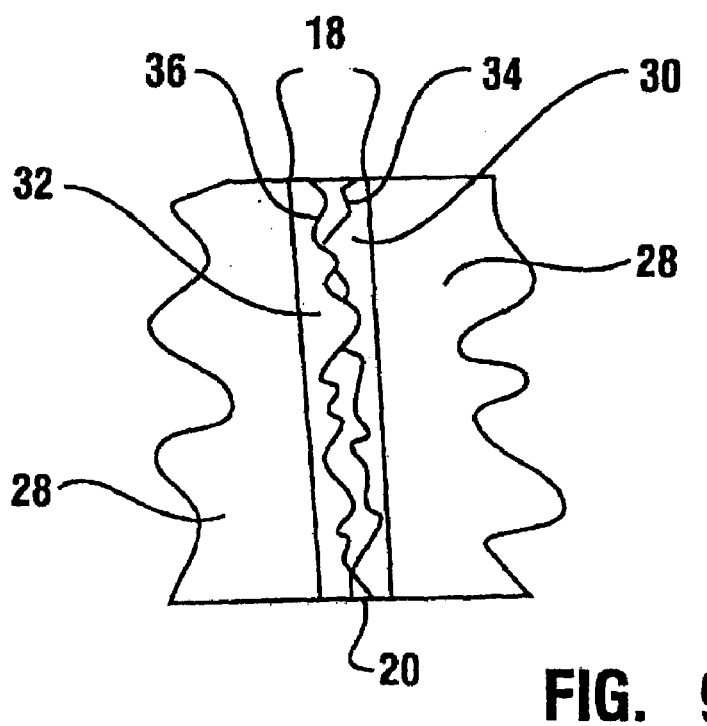
FIG. 9 is an illustration of a seam created by two irregular and different edge cuts, and portions of the label adjacent to the edge cuts.

Exemplary embodiments of in mold labels are illustrated in FIGS. 3–5 and 7. FIG. 3 illustrates a preferred embodiment of an exemplary label 12 for a cup 10. Label 12 comprises a design area 28, first and second registration areas 30 and 32, and first and second edge cuts 34 and 36. When applied to cup 10, the first and second edge cuts 34 and 36 meet to form a seam 20. The first and second registration areas 30 and 32 then merge to form a joined registration area 18. See also FIG. 8.

Label 12 may be made from any material which is currently in use, or which may in the future be developed, for making in mold labels. For example, label 12 may be made of a film or be a lens (lenticular) type label.

Label 12 may be made from any material which is currently in use, or which may in the future be developed, for making in mold labels. For example, label 12 may be made of a film or be a lens (lenticular) type label, paper, plastic or any other substrate.

Figure 5:
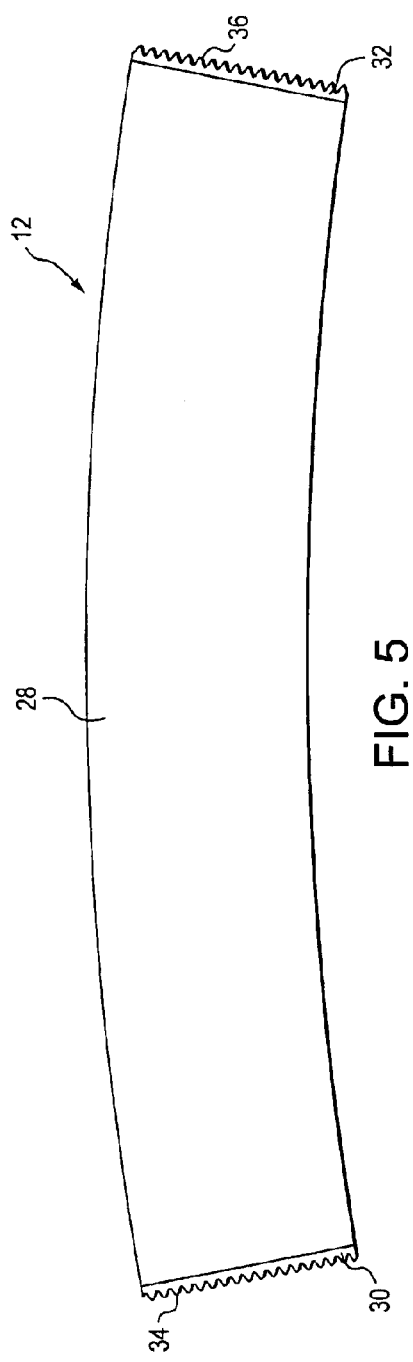
FIG. 5 is a design plan of an exemplary embodiment of an in mold wrap around label for a rectangular food container.

Other embodiments of edge cuts 34 and 36 are illustrated in FIGS. 4 and 5. An exemplary embodiment in FIG. 4 shows a cup label 12 that contains edge cuts 34 and 36 roughly in the shape of square waves, while FIG. 5 illustrates a rectangular label 12 for a container 22 that has edge cuts 34 and 36 shaped roughly as sawtooth waves.

Figure 6:
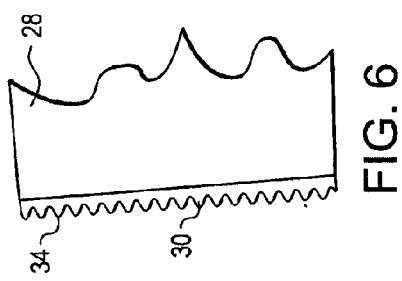
FIG. 6 is a close up view of registration area one edge of label of FIG. 5, using the same scale as the registration areas shown in FIGS. 4 and 5.

As illustrated in FIG. 6, the first edge cut 34, first registration area 30, and a portion of the adjacent design area 28 of a rectangular label 12 use the same scale as is used in the cup labels 12 illustrated in FIGS. 3 and 4. The wavelength of the edge cuts 34 and 36 are significantly longer, as shown in FIG. 3, than as shown in FIG. 6. Substantial variation is acceptable in both the wavelength and amplitude of any regular wave on which the edge cuts 34 and 36 are based. Extreme variations, however, may approximate a straight line and thus be unacceptable. For example, an extremely small amplitude wave will function essentially as a straight line and will thus be unacceptable. A wave with a wavelength that approximates the height of the label also will function essentially as a straight line and is similarly unacceptable.

Each of the edge cuts shown and described herein are characterized by being of a zig-zag type, wherein the edge cut changes direction several times over the course of the edge. As used herein, a zig-zag edge cut includes all edge cuts illustrated in FIGS. 3–9, which contain at least two peaks and valleys along one edge of a label. Alternatively, all edge cuts may have regular or irregular wave-like shapes, for example, the zig-zags may have an average wavelength of less then ½ of the edge with which it is associated. Alternatively, the zig-zags may substantially change direction at least four times along an edge. It is contemplated that the zig-zag edge cuts have sufficient non-linearity to prevent the formation of latent fractures in the resulting object to which the label is applied in mold.

FIG. 7 shows an exemplary embodiment of an edge cut 44 on an exemplary smaller isolated label 40. The exemplary edge cut 44 is in the shape of the edge cut 34, which is illustrated in FIG. 3. As with wrap around labels, embodiments of an edge cut 44 may also resemble a sawtooth wave, a square wave, or any other regular or irregular cut so long as the edge cut 44 does not approach a straight line.

Figure 6A:
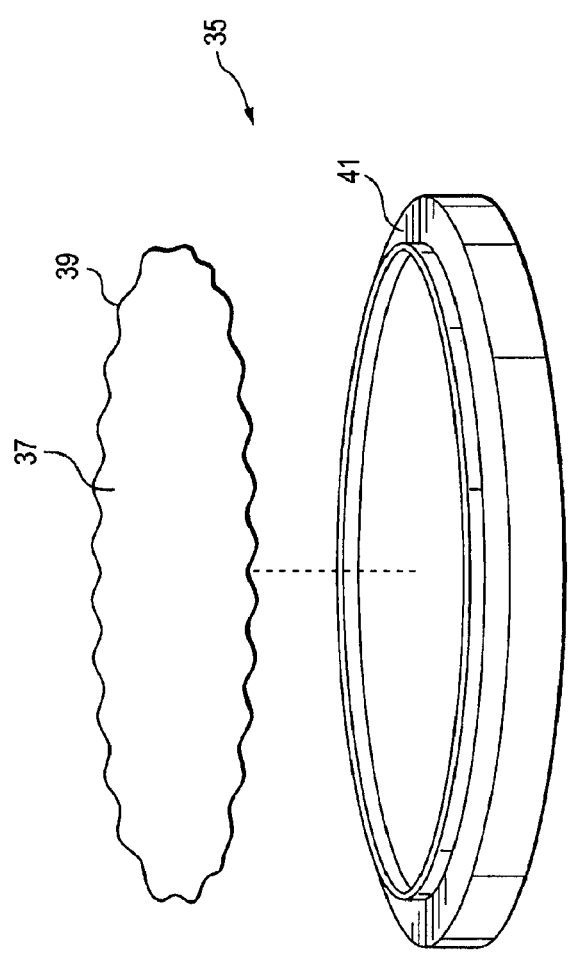
FIG. 6A is a perspective drawings of an exemplary label and lid for the embodiment of FIG. 1.

Additionally, the label may also be in the form of a top label, to be used as a lid for cup 10 or any container. For example, as shown in FIG. 6A, lid 35 may have a top label 37 and a frame 41. Top label 37 preferably has edge cuts 39 located around the perimeter of top label 37, as discussed above. The edge cuts 39 may be of any shape and arrangement desired. Top label 37 is placed in within frame 41 so as to rigidly engage frame 41. It is contemplated that lid 35 is shaped so as to complementarily engage any cup or container desired.

Returning to FIG. 5, another feature of an exemplary embodiment of the present invention comprises the first and second registration areas 30 and 32. The ink used in these registration areas 30 and 32 is chosen so that it is the same color as the resin used to create container 22. For example, traditionally food containers are white. If a label 12 is to be applied to a white container 22, white ink would be used in the registration areas 30 and 32. Similarly, if container 22 is to be made using green resin, a matching shade of green ink would be used in the first and second registration areas 30 and 32. Preferably, edge cuts 34 and 36 are contained entirely within the registration areas 30 and 32 to avoid an edge cut 34 or 36 that contains ink from design area 28, which may be a different color.

Traditional in mold labels are made using straight edge cuts without a registration area. The use of these traditional in mold labels creates two problems. The first problem is structural. As the resin flows over the in mold label during the injection process, the flow of the resin is altered along the straight edge of the in mold label. This alteration creates a latent fracture in the container contiguous to edge cut 34 or 36 of the label. This latent fracture is prone to become a straight line fracture through the container, along the seam line, when the container is subjected to pressure or to temperature extremes.

This latent fracture is created along any straight edge of an in mold label, but particularly along any straight edge that is generally parallel to the flow of the resin during the injection molding process. A latent fracture is created by the straight shape of the edge cuts of a label, rather than the seam. As can be seen by the latent fractures that are created along the straight edge cuts, small isolated labels have the same fracture problems as wrap around labels. Additionally, if one edge cut of a wrap around label is straight, and the other edge cut-resembles exemplary edge cut 34 as illustrated in FIGS. 3–5, a latent fracture forms in the resin contiguous to the straight edge. However, a latent fracture does not form in the resin contiguous to the non-straight edges if the edges do not touch. If the edges of a label are brought closer together during the molding process, so that the straight edge is tangent to edge cut 34 of an exemplary shape illustrated in FIG. 3 or 5, latent fractures form in the resin contiguous to the straight edge cut. If a container formed using such a label is subjected to stress, a fracture forms in the container along the straight edge cut. Such fractures do not form along any portion of the adjacent non-straight edge cut 34.

In order to compensate for the structural weaknesses caused by latent fractures, in mold labeled products created using injection molding technology are typically made with low melt resin, or are labeled after manufacturing. As discussed earlier, this requires a longer production time than if high melt resin is used. The alternative to using low melt resin and the use of post manufacturing labels, results in a less stable and less attractive label. Because labels 12 with non-straight edge cuts 34 and 36, illustrated in exemplary fashion in FIGS. 3–7, do not create latent fractures in the resulting containers, a manufacturer can use such in mold labels on high melt resin containers 22 using standard injection molding technology. This reduces manufacturing costs considerably. In an exemplary product, a one quart ice cream tub, the measured reduction in cycle time was approximately 30 percent.

In addition to reducing cycle time, the resulting in mold labeled container 22 made with high melt resin is sturdier than a comparable traditionally in mold labeled product made using low melt resin. The use of low melt resin compensates for the latent fracture by creating a product which is sturdier than is necessary everywhere but along the latent fracture line. Because the latent fracture is still present, under appropriate circumstances, a full fracture may develop. In contrast, the use of non-straight edge cuts 34 and 36 produces a container 22 in which there are no latent fractures.

The latent fractures are particularly striking when an in mold wrap around label is used, because the straight seam of a traditional in mold label extends the entire height of the container. When a smaller, isolated label is used, such as a label illustrated in FIG. 7, latent fractures are also created along any straight edges. Although the fractures that result when the package is subjected to stress may be smaller, they are still unacceptable. As it did with wrap around labels, using non-straight edge cuts on smaller in mold labels similarly eliminates the latent fractures associated with the use straight edge cut labels. Such labels also increase product quality and reduce the cycle time because high melt resin may be used. An exemplary isolated label applied in mold to a container is shown in FIG. 7.

Although the latent fractures created by traditional in mold labels are particularly evident in injection molded containers produced using high melt resin, a similar structural weakness may also form in containers created using blow mold technology. Many of these containers are required to be heavy duty, such as those used to hold large amounts of liquid detergent. Because of this, complex structural elements may be built into the mold to make the resulting containers sturdier. In addition, resin that creates a sturdier container may also be used. This makes the latent fractures created by in mold labels with straight edge cuts less obvious, in the same way they are less obvious when a low melt resin is used to create an injection molded container. Nonetheless, using labels with edge cuts similar to those illustrated by example in FIGS. 3–7 may improve in mold labeled containers produced using blow mold technology. The use of such labels will further increase the strength of the resulting containers. It may also permit the manufacturer to reduce the complexity of the molds where the structural complexity was designed to compensate for weaknesses created by latent fractures along the edges of traditional in mold labels.

Figure 10:
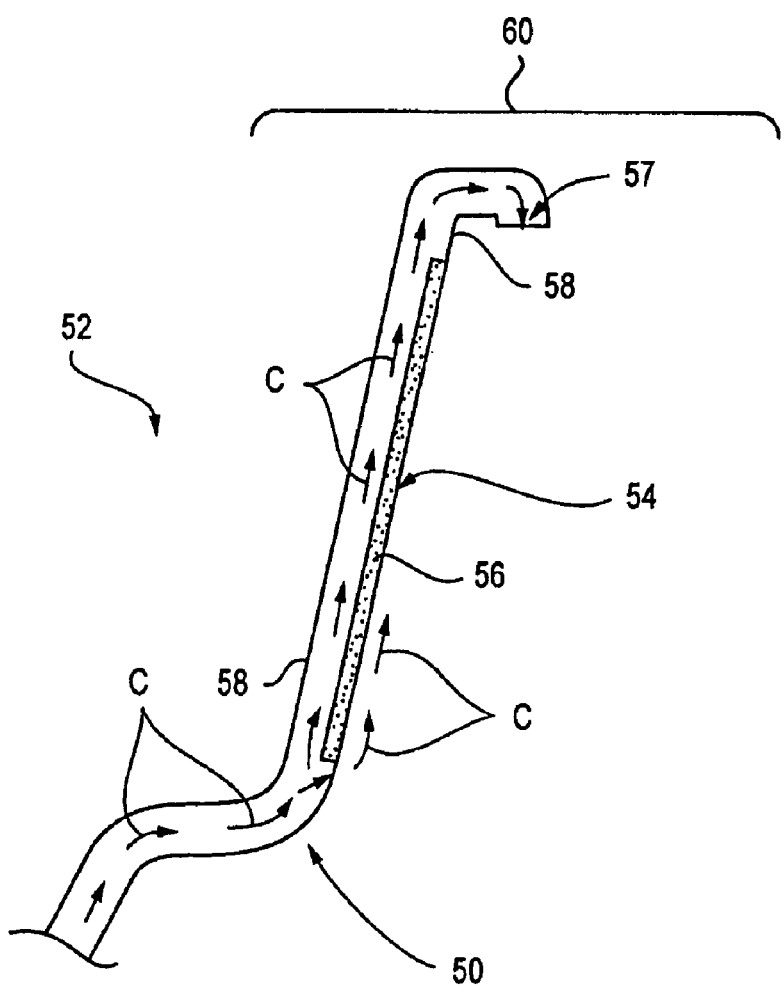
FIG. 10 is a cross-sectional drawing of the flow of plastic resin within the cavity walls of a conventional mold.

A problem created by the use of in mold labeling injection molding processes relates to containers formed with radiused corners or curved portions. Plastic cups commonly have a body that extends radially outwardly from a base to form the sides of the cup or container, or extends radially outwardly to form an elevated plane. Referring to FIG. 10, problems arise when the corners or radiused portions 50 of a container/cup 52 are adjacent the area 54 where an in mold label 56 is to be placed. Label 56 is placed along a cavity wall 58 within mold 60, at a predetermined location. During the injection molding process, resin is injected into cavity 57 of mold 60 and flows as indicated by arrows C. The injected resin often pushes label 56 out of its predetermined location. The flow of resin displaces label 56 away from cavity wall 58 and flows around both sides of label 56 (see arrows C), causing scrap.

Figure 14:
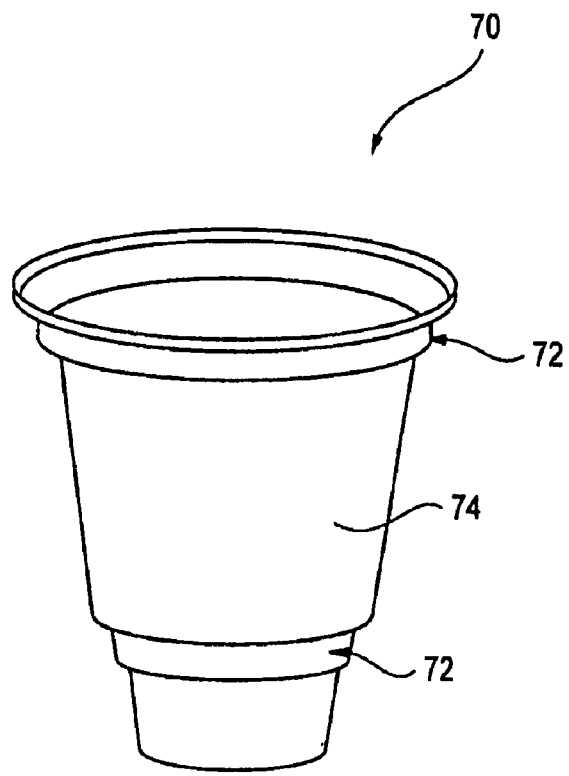
FIG. 14 is a perspective view of an alternative embodiment of an unlabeled cup.
Figure 15:
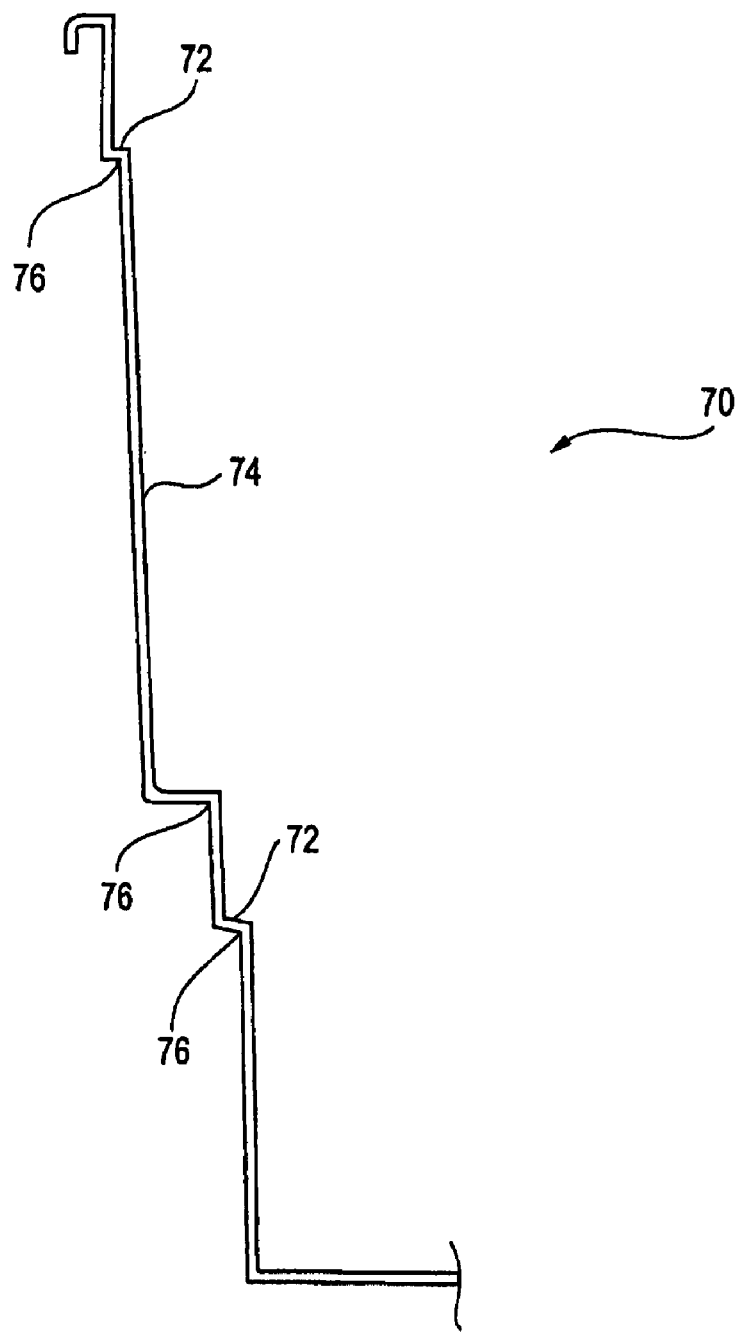
FIG. 15 a cross-sectional view of the embodiment of cup of FIG. 14.

As shown in FIGS. 11 and 12, according to the present invention, a cup 52 is to be formed with at least one ledge 62 formed in cavity wall 58 proximate the position intended for receipt of in mold label 56. The intended position for receipt of the in mold label 56 is typically the side wall of the cup or container. However, it is contemplated that the label may be placed around the entire exterior surface of the cup/container or any portions thereof. For example, as shown in FIGS. 14 and 15, an in mold label 56 may be intended to be placed on any elevated surface 70 of a container 52.

Referring to FIG. 12, ledge 62 protects the leading edge 64 of in mold label 56 from the flow of resin (see arrows C) through cavity 57. Because label leading edge 64 is protected, the resin is prevented from flowing behind label 56 and can only flow over the label. The resin flow pins the label to cavity wall 58, preventing displacement of label 56 relative to cavity wall 58.

The result of the injection molding process including a ledge, is that label 56 bonds with the resin in the intended orientation. As shown in FIG. 13, this results in a finish product, e.g., a cup 66, having a label 56 formed in the proper position, proximate a ledge 62.

The ledges 62 may be located anywhere on the cavity walls 58 of mold 60 that it is desired to place a label. It is contemplated that a ledge 62 may be located adjacent more than one side/edge of a label to prevent displacement due to resin flow. Moreover, ledge 62 may be located at the base of the cup/container or positioned at predetermined distance from the base of the cup 52, for example, ¼", ½", 1", 3", 4" or the like from the base.

It is further contemplated that ledge 62 may be in various shapes to form the sides or a raised surface of the cup/container 52. For example, the ledge may be a squared-off corner as shown in FIG. 15 (see reference number 72), a recessed corner (see reference number 76), a radiused corner, a curved shape, or the like.

Another problem created by the use of traditional or lenticular in mold labels is ostensibly an aesthetic problem, but it ultimately also increases the cost of production. When containers are formed using the injection mold process, the resin sometimes drags part of the ink from the edge cuts 34 and 36 with it as it flows past the edge of a label 24. This results in ink streaks in the unlabeled portions of container 22 that are distal to the injection site. The resin used is often white, particularly for food product containers, and the label ink is often another color. Even though the resulting containers are structurally sound and the coloration is harmless, food packagers typically reject containers with visible streaks. Thus, because a significant portion of the end product of each run is of an aesthetic quality that is unacceptable to most customers the use of traditional or lenticular labels creates waste and increases the cost of production.

This problem is resolved by placing the edge cuts 34 and 36 in registration areas 30 and 32 which contain ink that matches the resin used to manufacturer a container 22. Any ink that is dragged into the unlabeled area will not be visible because it the same color as the resin into which it has been dragged. As a result, using a label with registration areas 30 and 32 which contain ink that matches the resin of the container 22 will reduce manufacturing waste, further reducing manufacturing costs. Exemplary labels using a registration areas 30 and 32 containing ink that matches the resin may be wrapped around as illustrated in the exemplary embodiments represented in FIGS. 3–5, smaller and isolated as illustrated in the exemplary embodiment represented in FIG. 7, or of some other type known to those skilled in the art.

Ink streaks are significantly less likely in containers produced using blow molding technology, because the resin expands into the mold cavity, rather than moving parallel to the walls of the cavity as it does in an injection mold. This creates less drag against the edge cuts 34 and 36 of any in mold label, reducing the likelihood of ink being dragged from the edge cut 34 and 36 into the resin. In some instances, however, it may be desirable to further reduce the possibility of streaking. In such circumstances, using a label with registration areas 30 and 32 containing ink of the same color as the background resin maybe desirable for products made using blow mold technology.

Shown in FIG. 14 is an alternative embodiment of molded container 70. This embodiment of the present invention provides a ledge 72 in more than one location on the molded container. For example, as shown in FIGS. 14 and 15, the molded container may be a cup with a ledge 72 formed proximate the top and bottom of the cup. It is contemplated that ledge 72 may be at any desired location along a vertical plane of the cup. This ledge 72 area may be used for decoration labeling in addition to the typical labeling location on the side 74 of the cup. The additional decoration may be in the form of logos, designs or the like to enhance the aesthetic appearance of the cup/container 70.

Figure 16:
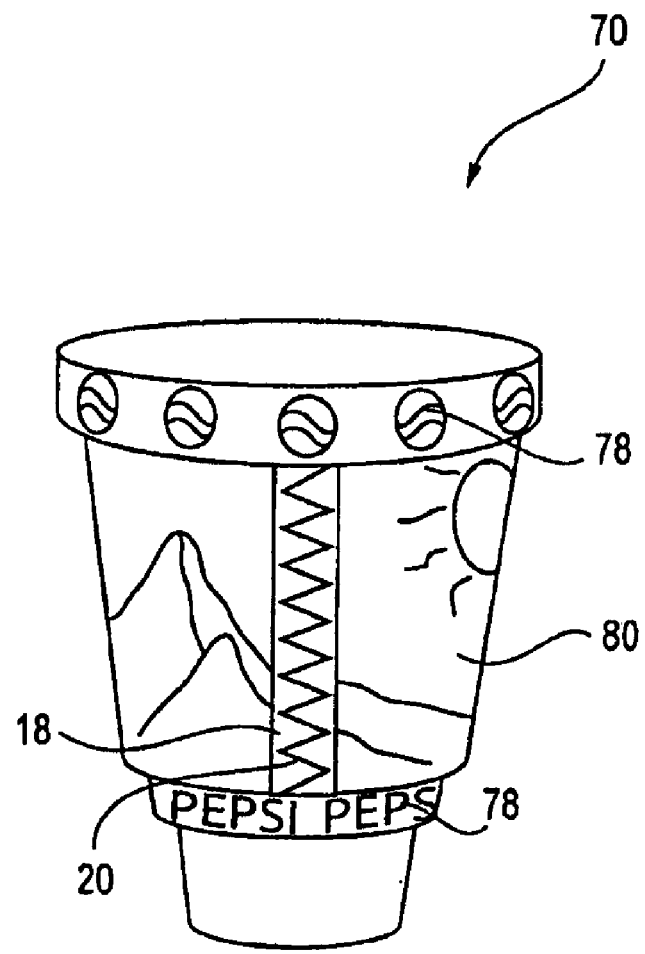
FIG. 16 is a perspective view labeled cup of the embodiment of FIG. 14.

As illustrated in FIG. 16, the additional decorations may be a separate label 78 applied to the ledges 72 proximate the top and bottom of cup 70. The labels may be formed on the cup via the above-disclosed molding process, at the same time as the primary label 80 or at some time after the primary label 80 is formed on the cup 70. Alternatively, the additional decorations may be printed or pressure sensitive labels applied to the container after the molding process. It is contemplated that the additional decoration (78) may be a conventional label, lenticular label, holographic, transparent, or opaque, and that different types of labels may be applied to a single cup/container, as desired.

Referring in FIG. 15, ledge 72 is a squared-off corner, as discussed above, that permits efficient and accurate placement of decorative label 78. As discussed in paragraph 77 above, placement of a label proximate ledge 72 protects the leading edge of the label, preventing resin flowing behind the label 56. The resin flow pins the label to mold cavity wall, preventing displacement of label.

As shown in FIG. 16, the two end edges of label 80 form a joined registration area 18. Roughly in the center of the joined registration area 18 is a seam 20, which is formed where the edges of a label 12 meet. Seam 20 may have an irregular or random pattern as shown.

Figure 17:
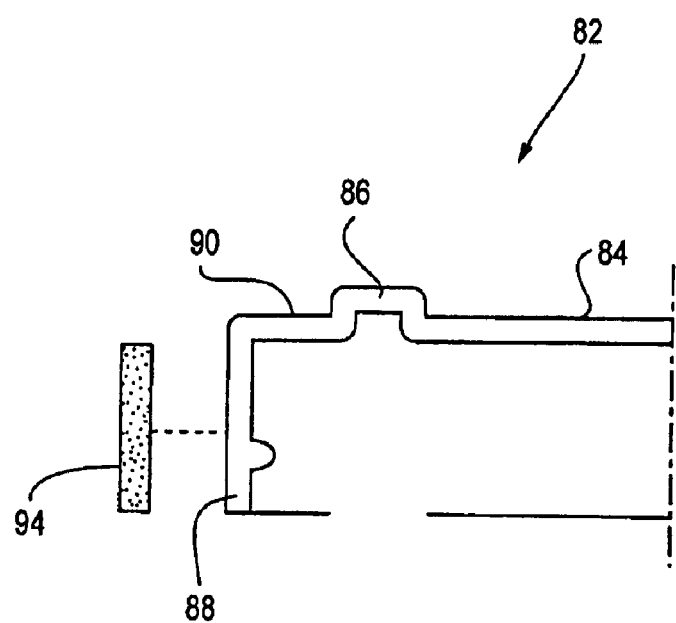
FIG. 17 is a cross-sectional view of an embodiment of lid according to the present invention with a label skirting to be applied to the side wall.
Figure 18:
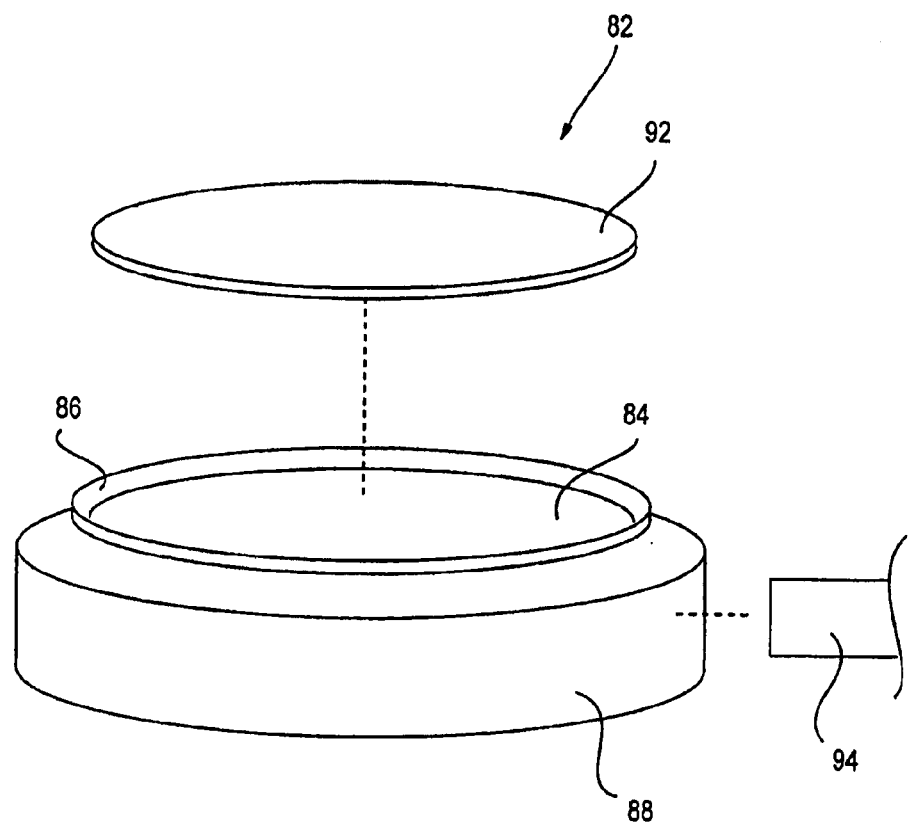
FIG. 18 is a perspective view of the embodiment of FIG. 17.

Molded containers typically have covers or lids to permit access to the interior and enclose the products stored therein. FIGS. 17 and 18 illustrate an embodiment of container lid according to the present invention. Lid 82 has a top portion or pan area 84, a nesting ring 86 and side walls 88. Pan area 84 is shaped to as to accommodate the attachment of a label 92, decoration or the like. Nesting ring 86 defines the perimeter of pan area 84.

Decorating lid 82 side walls 88 is known as "skirting." It is common to place labels or decorations on the side walls of a lid, but the labels often experience the same problems of latent fractures and streaks, as disclosed above. According to the present invention, a ledge 90 is located proximate the upper edge of the side wall. Ledge 90 may be located at various locations on lid 82. As shown in FIG. 17, skirting 94 may be applied to portions of the side wall 88, or around the entire circumference of side wall 88.

The labels applied to the lid pan area 84 and side walls 88 may be of a conventional type, lenticular, holographic, transparent, opaque, or the like. However, it is preferred that the labels and skirting is formed on the lid in an in mold process, as disclosed above for the container labeling. Alternatively, skirting 94 may be a label that extends the entire circumference of the side wall 88 and have a registration area and a seam, as disclosed above. A significant benefit to ledge 90 is that it prevents the leading edge of the label from being displaced during the injection of fluid resin during the molding process. This extends the life of the decoration and skirting on lid 82.

Figure 19:
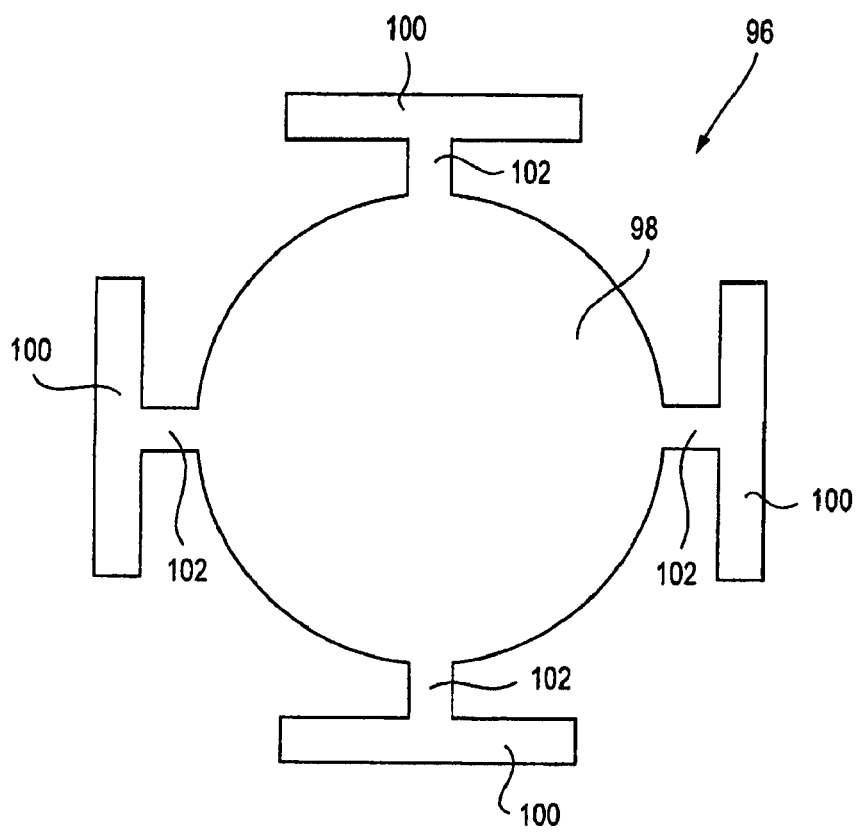
FIG. 19 is a top view of an exemplary embodiment of a container lid label.
Figure 20:
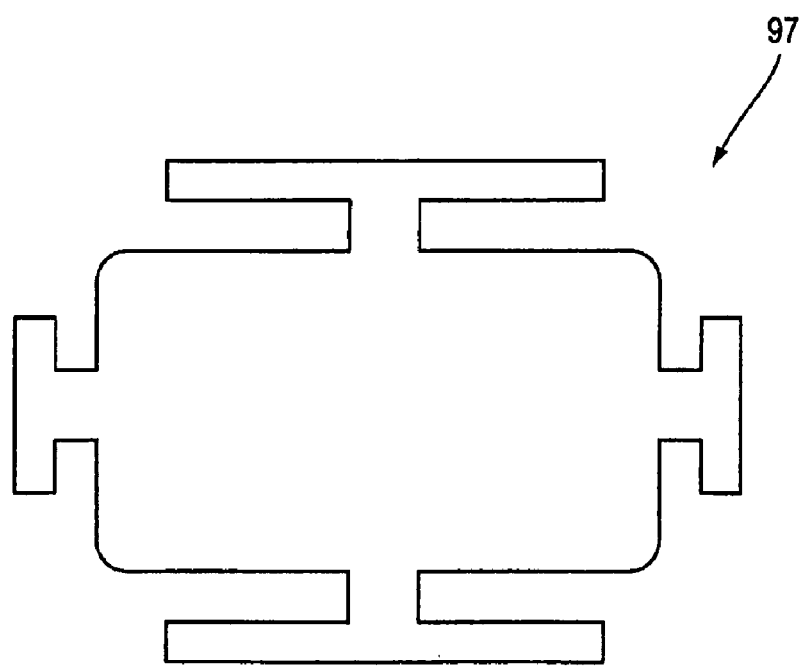
FIG. 20 is a top view of an alternative embodiment of a container lid label.
Figure 21:
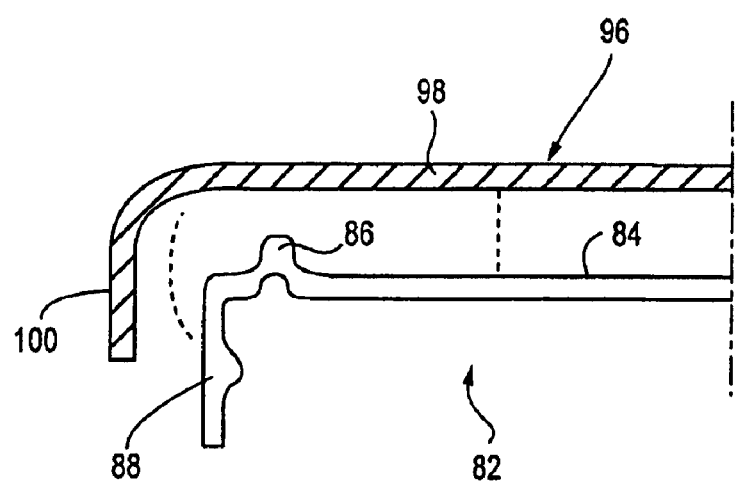
FIG. 21 is a graphical illustration of a label being applied to the embodiment of FIG. 20.

As shown in FIGS. 19–21, the label and skirting applied to lid 82 may alternatively be a unitary member. For example, FIG. 19 illustrates an embodiment of a unitary member according to the present invention. A unitary label 96 has a central pan area portion 98 and four skirt portions 100, connected-together by portions 102. Unitary label 96 is intended for a round lid. FIG. 20 illustrates a unitary pan area and skirting label 97 for a rectangular lid.

As shown in FIG. 21, during the process of applying the unitary label to the lid, unitary member 96 is placed over lid 82 so that pan area portion 98 rests on pan area 84, and skirting 100 overlays side walls 88. Unitary member 96 may be shaped so as to have portions of 98 to overlay and conform to nesting ring 86, as well as overlay a portion of side walls 88, when applied. Again, the unitary member may be any of the above identified types of labels. However, it is preferred that the label be applied to a lid in an in mold process.

The above-disclosed in mold labeled containers may be accomplished by various manufacturing techniques and equipment. For example, it is contemplated that the variously disclosed labels may be formed by die-cutting, flexographic printing, lenticular printing, or the like. Generally, the in mold labeled container process is as follows. A printer decorates labels and ships a reel of labels to a molder. The molder attaches the reel to a robotic unit that has a guillotine-type cutting mechanism.

Figure 22:
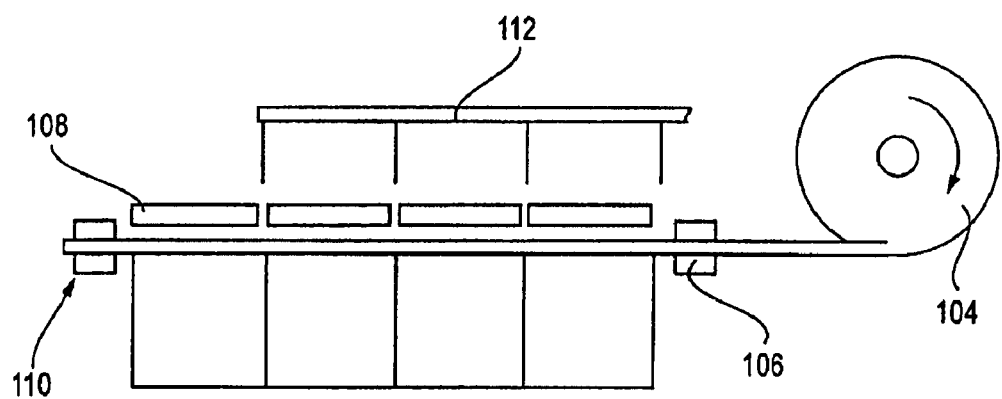
FIG. 22 is a side view of a graphical illustration of the formation of container and lid labels.
Figure 23:
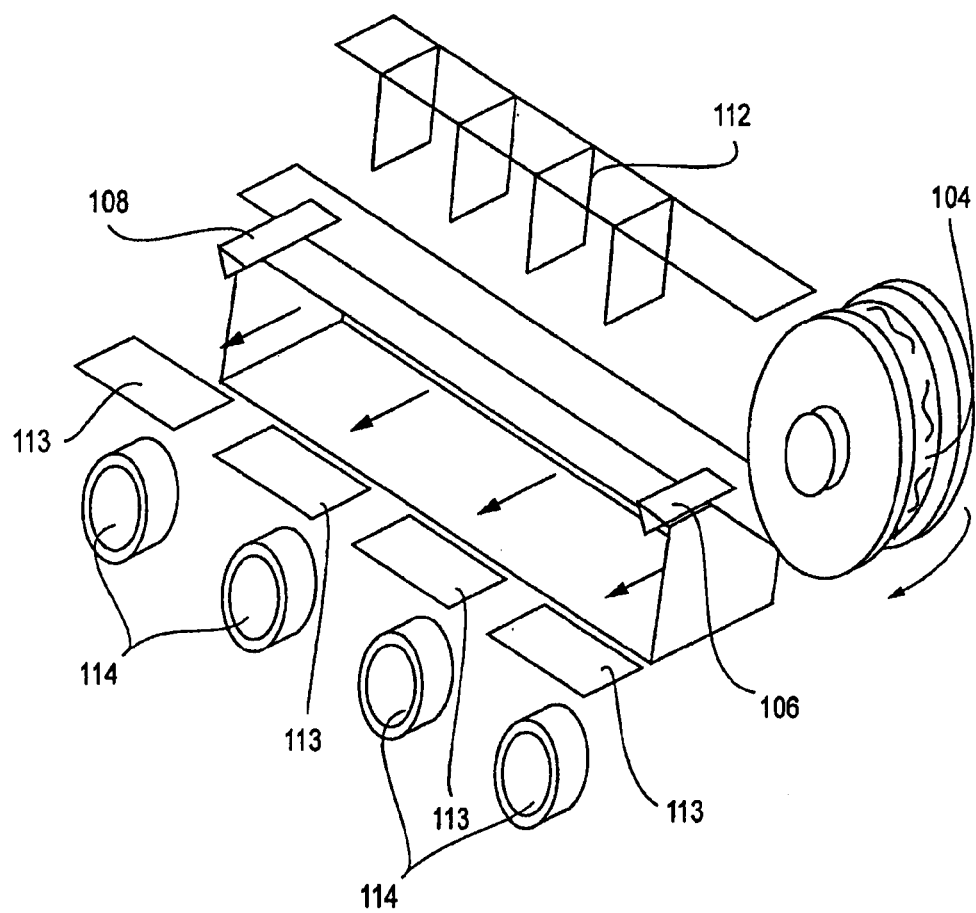
FIG. 23 is a perspective illustration of the embodiment of FIG. 22.

Referring to FIG. 22, the reel of labels 104 is fed via an end gripper device 106 through a guide clamp mechanism 108. A clamp engages the label, holding the label in place. Gripper 110 releases the end of the label and travels towards the reel assembly and re-clamps the label. Cutter 112 would move downwardly and cut a predetermined number of labels, for example 4 labels as shown in FIG. 22. The clamp mechanism 108 would then transfer the die-cut labels to a mandrel assembly, wrapping the label into the desired shape. See FIG. 23. As shown in FIG. 23, a label 113 is held to mandrel 114 via a vacuum porting device. Please note that the same mandrel could have a pan label as well as skirting and generic side wall labels.

Figure 24:
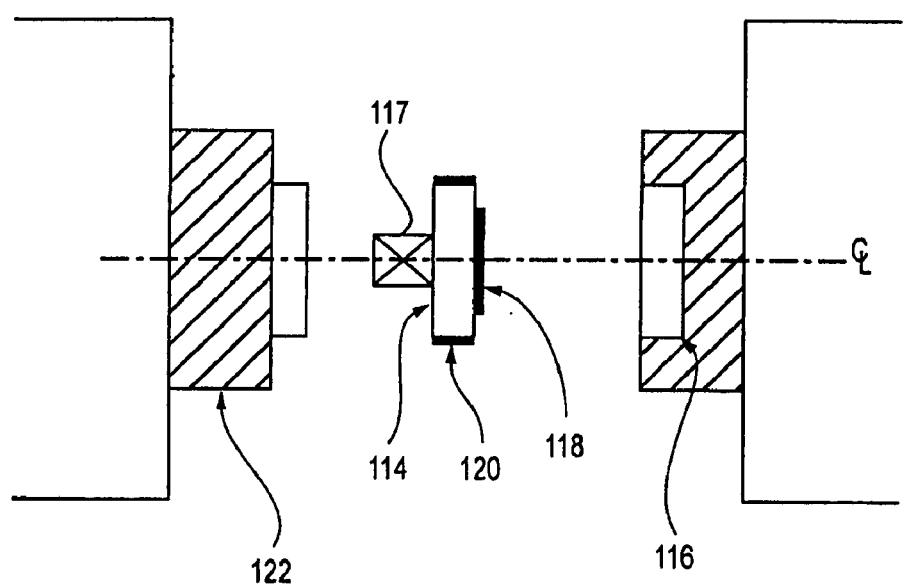
FIG. 24 is a cross-sectional view of the cavity walls of the mold of an embodiment of the present invention with labels positioned on the lid.

FIG. 24 illustrates an exemplary formation of a pan area and skirt labeled lid via the in mold process, according to the present invention. As shown, mandrel 114 is inserted into mold cavity 116 by a robotic arm 117 of the tooling device. The pan are label 118 and skirt label 120 are released, via vacuum porting and/or static charge, in place to the mold cavity walls (116, 122). The mold walls are then closed around mandrel 114 to being the in mold process to form the in mold labeled container, as disclosed above. It is contemplated that the skirting label may alternatively be applied in both conventional and reverse gated molding methods.

Although the exemplary embodiments described are labels primarily intended for in mold labeling of containers produced using injection mold technology, other embodiments may include labels for containers or products made using blow mold technology, or other resin molding technology. In other embodiments, the items to which a label is to be applied in mold may be a product other than a container. In still other embodiments, the item affixed to the product during molding may be something other than a traditional or lenticular label. For example it may be decorative emblem, or anything else which can be inked on a material suitable for use in affixing in mold to a product molded from resin.

It should be understood that the labels shown and described herein are exemplary. Other labels within the scope of the present invention will be apparent to those having skill in the art from the teachings herein.

Thus, the labels achieve the above stated objectives, eliminate difficulties encountered in the use of prior devices and systems, solve problems and attain the desirable results described herein.

In the foregoing description certain terms have been used for brevity, clarity, and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function and shall not be limited to the structures shown herein or mere equivalents thereof.

Having described the features, discoveries and the principles of the invention, the manner in which it is constructed and operated and the advantages and useful results attained; the new and useful structures, device elements, arrangements, parts, combinations, systems, equipment, operations, methods, and relations are set forth in the appended claims.

What is claimed is:

1. A mold for creating a molded plastic resin container cover having a skirting that displays an in-mold label comprising:
    a pan area;
    a recess in said pan area comprising a nesting ring defining the perimeter of the pan area;
    at least one side wall area comprising a skirting;
    a label ledge formed between said nesting ring recess and said side wall, said label ledge located proximate an upper edge of said side wall for receiving a label;
    wherein when a label is placed in the mold a leading edge of the label abuts the ledge and further wherein when liquid resin is injected into said mold to form the cover, the ledge guides the resin onto an inward side of the label and is substantially prevented from acting upon the leading edge of the label thus substantially preventing the label from being displaced in the mold such that substantially no resin flows between the label and the mold.

2. The mold of claim 1, wherein said recess comprises a ledge formed in the mold, said ledge having a depth at least as great as a thickness of the label, such that when the label is placed in the recess, the ledge directs the high melt resin over the label, thereby preventing the high melt resin from acting on an edge of the label abutting the ledge and displacing the label.

3. A device for creating a molded labeled container therein comprising:
    a mold having a bottom surface and at least one sidewall;
    a mold insert placeable in the mold to define a mold cavity between the mold insert and the mold, the mold cavity substantially defining the shape of a container formed therein;
    an injector placed to be usable to introduce liquid resin into the mold such that the liquid resin flows in a predetermined direction to fill the mold cavity; and
    a ledge formed in the mold said ledge being positioned in the sidewall at a distance elevated from the bottom surface of the mold, wherein the ledge is deep enough to accept a label of a predetermined thickness such that a leading edge of the label abuts the ledge, the ledge arranged such that when a label is placed in the mold with a leading edge of the label abutting the ledge, and liquid resin is introduced into the mold cavity via the injector, the resin flows in the predetermined direction, is guided by the ledge onto an inward side of the label, is substantially prevented from acting upon the leading edge of the label and thus being substantially prevented from displacing the label and from seeping between the label and the mold.

4. The device of claim 3 wherein the mold cavity is shaped to form a cup.

5. The device of claim 3 wherein the mold cavity is shaped to form a food container.

6. The device of claim 5 wherein the mold cavity is shaped to form an ice cream container.

* * * * *